(No Model.)
E. E. CROOKS.
DRAFT EQUALIZER.
No. 309,528.  Patented Dec. 23, 1884.
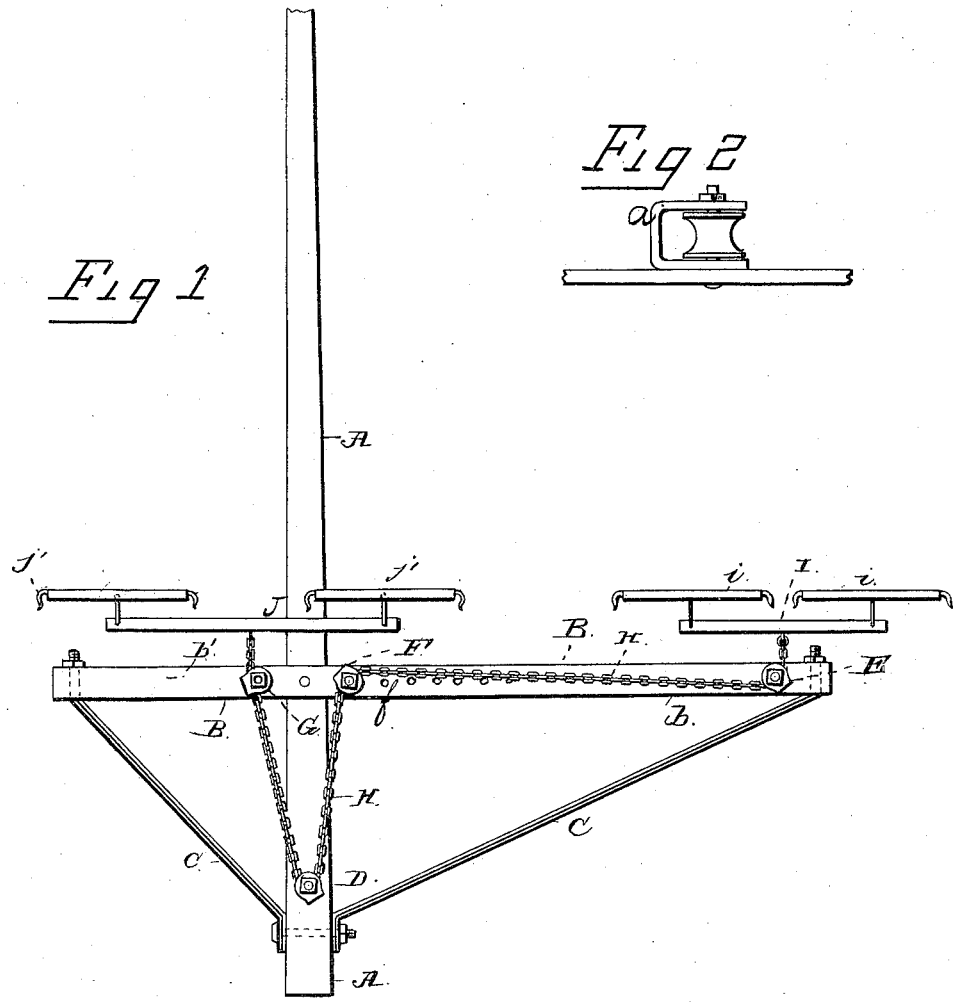
Witnesses.
P. B. Turpin
M. E. Fowler
Inventor.
Elmer E. Crooks
By R. S. & A. P. Lacey
Attys.

UNITED STATES PATENT OFFICE.

ELMER E. CROOKS, OF ST. CHARLES, MINNESOTA.

DRAFT-EQUALIZER.

SPECIFICATION forming part of Letters Patent No. 309,528, dated December 23, 1884.

Application filed September 23, 1884. (No model.)

*To all whom it may concern:*

Be it known that I, ELMER E. CROOKS, a citizen of the United States, residing at St. Charles, in the county of Winona and State of Minnesota, have invented certain new and useful Improvements in Draft-Equalizers; and I do declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to draft-equalizers intended especially for use on heavy-draft grain-binders and similar machines; and it has for its object simple and convenient construction by which three horses may be arranged on one side of the tongue and one horse on the other, and the side draft incident usually to such arrangement may be obviated.

The invention consists in certain details and parts of construction, combined and arranged substantially as hereinafter more fully described and claimed.

In the drawings, Figure 1 represents my invention in plan view. Fig. 2 is a detail view of one of the pulleys.

Attached to the tongue A is an evener or draft-bar, B, arranged at right angles to the tongue, and having one arm, $b$, longer than the other, $b'$, the long arm $b$ being projected usually to the right. In practice I prefer to brace the bar B by strut-rods C C, secured at one end to the tongue in rear of the draft-bar, and at their other ends to the outer ends of the arms of such bar B, as shown. On the pole in rear of the bar B is secured a guide-pulley, D. A similar pulley, E, is arranged on or near the outer end of the long arm $b$. Pulleys F G are arranged with bar B on respectively the right and left sides of and close to the pole. The pulley F is preferably adjustable on the arm $b'$, for the purpose presently described. In practice I find it convenient to secure this adjustment by means of a series of bolt-holes, $f$, formed through the arm $b$, the pivot-bolt of pulley F being movable from one to the other of these holes in order to vary its position. It is manifest, however, this adjustment could be secured in various ways other than that shown without departing from the principles of my invention—as, for instance, a stirrup or loop embracing the arm $b$ and provided with a pivot for the pulley, and a suitable clamp by which it might be secured at any desired point to the arm. All of the pulleys, it will be seen, are provided with guard portions $a$, as most clearly shown in Fig. 2, by which the chain is held in bearing with the pulleys.

Attached to one end of the chain H is the double-tree I, having single-trees $i$. The chain is carried back from this double-tree under pulley E, and thence around pulleys F D G, in the manner shown, having the double-tree J, with single-trees $j j$ on its other end. The pulley G is so arranged that double-tree J is supported astride the tongue with one of its whiffletrees $j$ on each side thereof, thus throwing three horses, those hitched to single-trees $i i$ and the right one, $j$, on one side of the tongue, and only one horse on the other or left side of the tongue. This horse, it will be seen, can move close to the growing grain. By connecting the double-trees by the chain each pair of horses draws directly against the other pair, and the point of application of force is the same for both, and is the pulley D, as will be understood. By adjusting the pulley F toward the extremity of arm $b$, the direction of draft of the horses hitched to arm $b$ is changed and made to approximate more nearly the line between pulleys D E.

Having thus described my invention, what I claim, and desire to secure by Letters Patent, is—

1. The combination of the tongue, the evener secured thereto at right angles, and having arms $b$ $b'$, extended on opposite sides of the tongue, the pulley D, secured on the tongue in rear of the evener, the pulleys E F, secured on arm $b$, and pulley G on arm $b'$ of the evener, and the chain H, having double-trees on its opposite ends, and disposed around the pulleys E F D G, substantially as set forth.

2. The combination of the tongue, the bar B, having arms $b$ $b'$, the pulley E, secured on the outer end of arm $b$, the pulley F, secured and adjustable along the inner end or portion of the arm $b$, the pulleys D, arranged on the tongue in rear of the evener, the pulley G, secured on the arm $b'$ close to the tongue, and the chain H, carried around pulleys E F D G, and having double-trees I at one end and J at the other, the latter being astride the tongue, substantially as set forth.

In testimony whereof I affix my signature in presence of two witnesses.

ELMER E. CROOKS.

Witnesses:
J. C. WOODWARD,
R. LUDOVICI.